United States Patent Office 2,850,411
Patented Sept. 2, 1958

2,850,411

METHOD FOR REMOVING COATINGS FROM FILM BASE

Kurt Bratring, Berlin-Dahlem, Germany, assignor of one-half to Paul O. Tobeler, doing business under the name of Trans-Oceanic, Los Angeles, Calif.

No Drawing. Application January 23, 1956
Serial No. 560,878

7 Claims. (Cl. 134—29)

This invention relates to the treatment of photographic film to remove various coatings normally applied to the Celluloid film base during film manufacturing, and more particularly has to do with a method for the removal of such coatings in which they are completely dissolved to leave the film base in clear and stable form, without causing more than slight dissolution of the Celluloid. The presently disclosed method is particularly applicable to the processing of old photographic films to render their Celluloid film bases reusable.

Generally speaking, in the manufacture of films the base Celluloid is first coated with a carrier or subbing material for the subsequently applied light-sensitive emulsion, the carrier being capable of bonding with the Celluloid base and normally containing albumen. Representative compositions of carrier layers are as follows: gelatine, albumin or casein.

In addition, protective lacquer cover coatings are often applied to films so as to preclude scratching or multilation of the film surfaces, and organic cellulose ester layers are sometimes applied to the reverse sides of the films, particularly those having sound track formed thereon.

Among the expedients resorted to in the past for removing the various coatings and layers on Celluloid film base in order to render it reusable were mechanical film treatment processes including scraping away the light-sensitive emulsion layers on the films, coupled with chemical treatment of the films, the latter including contacting the films with dilute or weak solutions of caustic soda to remove remaining coatings. However, it has been found that such processes are not applicable for the removal of all layers and especially albumen-containing coatings, since the latter are not completely dissolved by the dilute caustic solution. In addition, it has been found that the dilute caustic solution adversely affects the Celluloid film base causing destructive saponification of the Celluloid surface, particularly at the solution temperatures under which the treatment of the film is carried out. For example, a 2% aqueous solution of caustic soda at temperatures around 90° centigrade brings about serious saponification of the Celluloid base of film contacted by the solution.

In addition, where it has been attempted to remove nitro-cellulose containing lacquer coatings from film by mechanically scrubbing or scraping the film and simultaneously applying caustic soda solution, saponification of the lacquer coatings occurs to form scale in the solution tending to deposit on moving parts of the machinery and to adhere to the film itself to such an extent that it cannot be removed in subsequent rinsing steps. Organic cellulose-ester layers on films are also susceptible to saponification by the dilute caustic soda solutions previously used, producing glossy scale particles adherent to the film base, destroying its utility.

The present process for the treatment of film includes contacting the film with concentrated aqueous solution of caustic soda or caustic potash to secure complete dissolution of all the coatings or layers built up on the Celluloid base, without causing adverse saponification of the base, even at the higher solution temperatures under which the process is advantageously carried out. Dissolution of the Celluloid base occurring during the process is so small as to be insignificant, leaving the base in clear or unclouded and stable form. Also, the concentrated caustic solution acts to completely dissolve the various adherent coatings on the film base and derivatives thereof formed during the process to the extent that no scaly particles remain in the solution or upon the film base.

The advantageous results of the present process are achieved when the concentration of the caustic solution, containing caustic soda or caustic potash or a combination thereof, lies between 16 and 50 percent. Also, the temperature of the solution should be kept between 70° and 85° centigrade, and the treatment should continue for between 1 and 5 minutes depending upon the hardness and the thickness of the various coatings from the film, including the intermediate or carrier layer, the light-sensitive emulsion on the carrier, the organic-ester layer on the reverse side of the film and the lacquer coating over the film.

For higher efficiency in the removal of the layers or coatings, the light-sensitive emulsion may be first removed and dissolved by passing the film through an aqueous bath containing low concentration sodium hydroxide or sodium carbonate solutions, in which the solution concentration is kept between 5 and 10 percent. Any scale formed during this step is dissolved when the film is then subjected to the above described treatment with concentrated caustic soda or caustic potash solutions.

It is contemplated that various film rinsing or washing agents inactive to Celluloid may be utilized to remove any caustic solution remanent upon the film base. For example, water or various organic solvents such as ether-alcohol may be used to wash the film.

*Example 1*

A photographic film strip, the light-sensitive emulsion coating of which has been removed from the carrier layer comprising gelatine, albumin, or casein is placed in a bath of a 30 percent aqueous solution of caustic potash (specific weight 1.29) kept at a temperature of 70° centigrade. After 2 minutes the film is removed from the bath and thereafter spray-rinsed with water and dried, the resulting Celluloid film base being both clear and stable.

*Example 2*

A photographic film strip, the light-sensitive emulsion layer of which has been removed from the carrier layer comprising gelatine, albumin or casein is treated for 5 minutes with 25 percent caustic soda solution kept at a temperature of 70° centigrade. After rinsing and drying the film, it was found that all coatings had been removed from the Celluloid base, which was in clear and stable form, and its thickness had been reduced by only 0.01 millimeter.

*Example 3*

A developed photographic film strip provided with sound tracks, the reverse side of which film shows a thin layer of organicellulose ester, was treated in a bath of a 16 percent sodium carbonate solution at a temperature of 70° centigrade. After 3 minutes it was found that the gelatine layer containing the sound tracks had been removed. The film was subsequently treated for 5 minutes in a second bath of a 30 percent caustic soda solution at a temperature of 75° centigrade. After rinsing and drying the film, it was found that all coatings had been removed from the Celluloid base, which was in clear and stable form, and was soluble in acetone without becoming cloudy.

Example 4

An old photographic film strip, the picture-side of which is covered with a nitro-cellulose containing lacquer coating, is placed in a bath of a 26 percent aqueous solution of caustic potash kept at a temperature of 70° centigrade. Within 5 minutes the nitro-cellulose containing lacquer coating is first removed, while subsequently the gelatine containing picture-side and finally the albumen containing intermediate or carrier layer is dissolved. The film strip is then spray-rinsed with water and dried. The resulting Celluloid film strip is both clear, stable and soluble in acetone without becoming cloudy.

I claim:

1. The method of treating photographic film to free its Celluloid base of a superposed adherent coating consisting of at least one protein carrier material for a light sensitive emulsion, that includes contacting the film with a concentrated aqueous solution of alkaline material selected from the group consisting of caustic soda and caustic potash to dissolve said coating, said solution having a concentration of between 16 and 50 percent and thereafter washing the film with a Celluloid inactive liquid to remove remanent caustic solution from the film base.

2. The method of treating photographic film to free its Celluloid base of superposed adherent coatings of the class consisting of at least one protein carrier material for a light sensitive emulsion and a lacquer cover material for said emulsion, that includes contacting the film with a concentrated aqueous solution of alkaline material selected from the group consisting of caustic soda and caustic potash for a time interval sufficient to dissolve said coatings, said solution having a concentration of between 16 and 50 percent and thereafter washing the film with a Celluloid inactive liquid to remove remanent caustic solution from the film base.

3. The method of treating photographic film to free its Celluloid base of superposed adherent coatings of the class consisting of at least one protein carrier material for a light sensitive emulsion and a lacquer cover material for said emulsion, that includes contacting the film with a hot aqueous solution of alkaline material selected from the group consisting of caustic soda and caustic potash having a solution concentration of between 16 and 50 percent for a time interval sufficient to dissolve said coatings without causing more than slight dissolution of the film base, and thereafter washing the film with a Celluloid inactive liquid to remove remanent caustic solution from the film base.

4. The method of treating photographic film to free its Celluloid base of superposed adherent coatings of the class consisting of at least one protein carrier material for a light sensitive emulsion and a lacquer cover material for said emulsion, that includes contacting the film with a hot concentrated aqueous solution of alkaline material selected from the group consisting of caustic soda and caustic potash for between one and five minutes to dissolve said coatings without causing more than slight dissolution of the film base, said solution having a concentration of between 16 and 50 percent and thereafter washing the film with a Celuloid inactive liquid to remove remanent caustic solution from the film base.

5. The method of treating photographic film to free its Celluloid base of superposed adherent coatings containing in addition to a light sensitive emulsion at least one of the materials including nitro-cellulose, albumen and organic cellulose ester, said method including contacting the film with a concentrated aqueous solution of alkaline material selected from the group consisting of caustic soda and caustic potash having a solution concentration of between 16 and 50 percent and a temperature between 70 and 85 degrees centigrade for a time interval sufficient to dissolve said coatings without causing more than slight dissolution of the film base, and thereafter washing the film with a Celluloid inactive liquid to remove remanent caustic solution from the film base.

6. The method of treating photographic film to free its Celluloid base of superposed adherent coatings containing in addition to a light sensitive emulsion at least one of the materials including nitro-cellulose, albumen and organic cellulose ester, said method including contacting the film with a concentrated aqueous solution of alkaline material selected from the group consisting of caustic soda and caustic potash having a solution concentration between 16 and 50 percent and a temperature between 70 and 85 degrees centigrade for a time interval between one and five minutes, and thereafter washing the film with a Celluloid inactive liquid to remove remanent caustic solution from the film base.

7. The method of treating photographic film to free its Celluloid base of superposed adherent coatings containing in addition to a light sensitive emulsion at least one of the materials including nitro-cellulose, albumen and organic cellulose ester, said method including contacting the film with an aqueous solution of materials selected from the group consisting of sodium hydroxide and sodium carbonate to dissolve the light-sensitive emulsion layer on the film, thereafter contacting the film with a hot concentrated aqueous solution of alkaline material selected from the group consisting of caustic soda and caustic potash to dissolve remanent adherent coatings on the film base, said hot concentrated alkaline solution having a concentration of between 16 and 50 percent, and then washing the film with a Celluloid inactive liquid to remove remanent caustic solution from the film base.

References Cited in the file of this patent

UNITED STATES PATENTS

| | | |
|---|---|---|
| 1,575,346 | Lohn | Mar. 2, 1926 |
| 1,669,394 | Ellis | May 8, 1928 |
| 2,571,686 | Davis | Oct. 16, 1951 |
| 2,688,614 | Fox | Sept. 7, 1954 |